(12) United States Patent
Mariethoz et al.

(10) Patent No.: US 8,682,624 B2
(45) Date of Patent: Mar. 25, 2014

(54) DETERMINISTIC VERSION OF THE MULTIPLE POINT GEOSTATISTICS SIMULATION/RECONSTRUCTION METHOD WITH THE SIMULATED/RECONSTRUCTED VALUES ARE DIRECTLY TAKEN FROM THE TRAINING IMAGES WITHOUT PRIOR ESTIMATION OF THE CONDITIONAL

(75) Inventors: Gregoire Mariethoz, Sydney (AU); Philippe Renard, Neuchatel (CH); Julien Straubhaar, La Chaux-de-Fonds (CH)

(73) Assignee: University of Neuchatel, Neuchatel (CH)

( * ) Notice: Subject to any disclaimer, the term of this patent is extended or adjusted under 35 U.S.C. 154(b) by 101 days.

(21) Appl. No.: 13/108,393

(22) Filed: May 16, 2011

(65) Prior Publication Data
US 2011/0251833 A1    Oct. 13, 2011

Related U.S. Application Data

(63) Continuation of application No. PCT/EP2008/009819, filed on Nov. 20, 2008.

(51) Int. Cl.
*G01V 99/00* (2009.01)
(52) U.S. Cl.
CPC .......... *G01V 99/00* (2013.01); *G01V 2210/665* (2013.01)
USPC ..................................... 703/2; 703/6; 703/10
(58) Field of Classification Search
CPC ............ G01V 99/00; G01V 2210/665; G01V 2210/6652; G01V 1/30; G01V 11/00
See application file for complete search history.

(56) References Cited

U.S. PATENT DOCUMENTS

| 5,111,411 A * | 5/1992 | Browne ........................ 382/141 |
| 2006/0041410 A1 | 2/2006 | Strebelle |
| 2009/0164182 A1* | 6/2009 | Pedersen et al. .................. 703/2 |
| 2009/0259446 A1* | 10/2009 | Zhang et al. ...................... 703/2 |

FOREIGN PATENT DOCUMENTS

| FR | 2905181 A1 | 2/2008 |
| WO | 2006023602 A2 | 3/2006 |
| WO | 2007008658 A1 | 1/2007 |
| WO | 2010057505 A1 | 5/2010 |

OTHER PUBLICATIONS

International Preliminary Report on Patentability with Written Opinion of the parent application, International Application No. PCT/EP2008/009819 dated May 24, 2011.

(Continued)

*Primary Examiner* — Dwin M Craig
*Assistant Examiner* — Jay B Hann
(74) *Attorney, Agent, or Firm* — Blank Rome LLP

(57) ABSTRACT

A method of simulating, reconstructing and scaling digital data sets, in particular images, but not exclusively. The method of the invention is based on a training image that is directly sampled each time a point in the simulation image is to be filled, and does not need the preliminary creation of a data structure storing conditional probabilities, as it is often the case in known multipoint simulation method. Accordingly, the method of the invention is less memory-demanding than conventional methods, and is better suited to simulations including continuous variables. Embodiments regarding the application to reconstruction of partial images and downscaling are also presented.

11 Claims, 6 Drawing Sheets

(56) References Cited

OTHER PUBLICATIONS

Y. Liu, Using the Snesim program for mkultiple-point statistical simulation, Computers & Geosciences, Elsevier Ltd., vol. 32, Feb. 8, 2006, pp. 1544-1563, www.elsevier.com.

T. Zhang, Incorporating Geological Conceptual Models and Interpretations into Reservoir Modeling Using Multiple-Point Geostatistics, Earth Science Frontiers, vol. 15, Issue 1, Jan. 2008, pp. 26-35, ScienceDirect, www.sciencedirect.com.

International Search Report with Written Opinion for PCT/EP2008/009819 dated Nov. 11, 2009.

T.L. Chugunove and L.Y. Hu, Multiple-Point Statistical Simulations Constrained by Continuous Auxiliary Data, International Association for Mathematical Geology XIth International Congress, Sep. 3-8, 2006, 6 pgs., Universite de Liege—Belgium.

F.B. Guardiano and R.M. Srivastava, Multivariate Geostatistics: Beyond Bivariate Moments, 1993, Geostatistics Troia '92, vol. 1, pp. 133-144, Kluwer Acad. Publ., Dordrecht.

L.Y. Hu and T. Chugunova, Multiple-Point Geostatistics for Modeling Subsurface Heterogeneity: A Comprehensive Review, Water Resources Research, vol. 44, W11413, Nov. 12, 2008, pp. 1-14, American Geophysical Union.

S. Strebelle, Conditional Simulation of Complex Geological Structures Using Multiple-Point Statistics, Mathematical Geology, vol. 34, No. 1, Jan. 2002, pp. 1-21, International Association for Mathematical Geology.

T. Zhang, P. Switzer, and A. Journel, Filter-Based Classification of Training Image Patterns for Spatial Simulation, Mathematical Geology, vol. 38, No. 1, Jan. 2006, pp. 63-80, International Association for Mathematical Geology.

T. Zhang, Incorporating Geological Conceptual Models and Interpretations Into Reservoir Modeling Using Multiple-Point Geostatistics, Earth Science Frontiers, vol. 15, Issue 1, Jan. 2008, pp. 26-35, www.sciencedirect.com.

S. Strebelle and A.G. Journel, Sequential Simulation Drawing Structures From Training Images, Kleingeld and Krige Geostatistics, vol. 1, 2000, pp. 1-12, Cape Town, StanFord Center for Reservoir Forecasting.

* cited by examiner

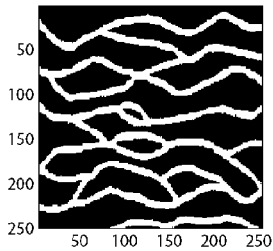
Fig. 4a
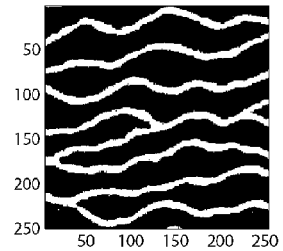
Fig. 4b
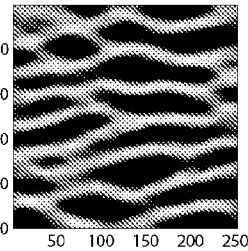
Fig. 4c
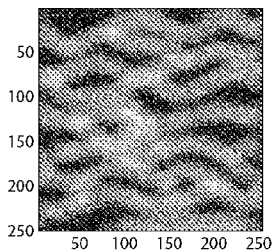
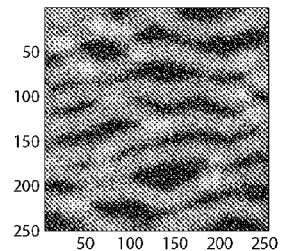
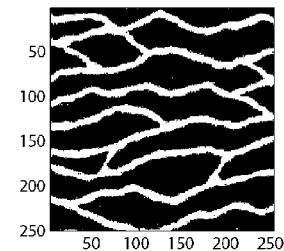
Fig. 4d    Fig. 4e    Fig. 4f
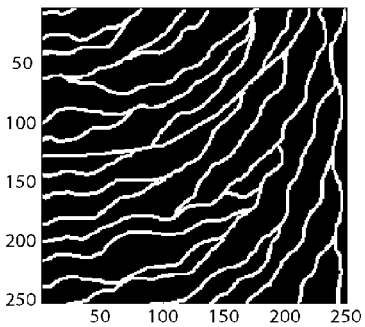
Fig. 5a
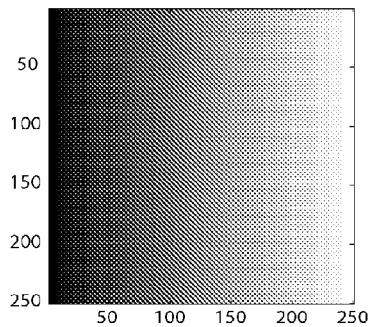
Fig. 5b
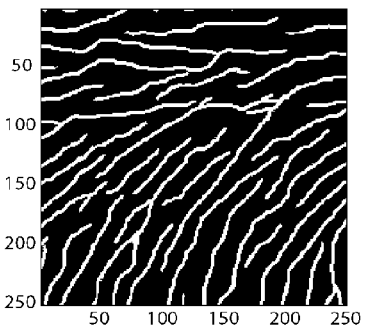
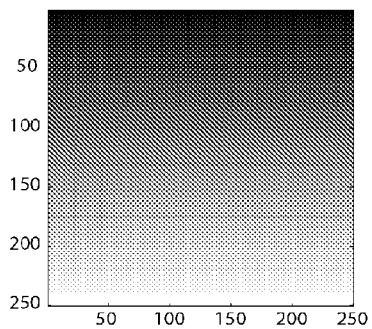
Fig. 5c    Fig. 5d

DETERMINISTIC VERSION OF THE MULTIPLE POINT GEOSTATISTICS SIMULATION/RECONSTRUCTION METHOD WITH THE SIMULATED/RECONSTRUCTED VALUES ARE DIRECTLY TAKEN FROM THE TRAINING IMAGES WITHOUT PRIOR ESTIMATION OF THE CONDITIONAL

RELATED APPLICATIONS

This application is a continuation of PCT Application No. PCT/EP2008/009819 (WO2010/057505), filed Nov. 20, 2008, the contents of which are hereby incorporated by reference in their entirety.

FIELD OF THE INVENTION

The present invention concerns generally methods for completing or reconstructing an incomplete data sample, and to their uses and applications. In particular, the present invention relates to the use of the method in building statistical models of geological reservoirs, but also to the generation and scaling of synthetic images, to the reconstruction of defective images, as well as to the prediction of time series.

DESCRIPTION OF RELATED ART

In the field of geostatistics, it is known how to employ two-points and multiple-points statistics for generating simulations in order to predict the amount of oil and gas reserves. With the same techniques, it is also known how to model the geometry and the physical parameters of the reservoirs allowing to model oil or gas flow through the reservoir and optimize its recovery. Multiple-points statistics simulation techniques are recognized as the most flexible methods known so far to integrate a conceptual geological model in a statistic framework, and are widely used in the petroleum industry and in hydrogeology.

Such simulations typically use 2D or 3D models of the reservoir that includes a grid of a large number, often in excess of a million, of individual cells. These models typically represent the values of one physical property, often the underlying geological facies expressed as a discrete-valued category variable. The goal of modeling is to obtain an image of the underground reservoir that reflects the knowledge of the general geological structures present on the site, restrained by conditioning values measured at certain points, for example corresponding to wells, and by other auxiliary information, like seismic data.

Oil reservoirs present several different morphologies, possess a large amount of heterogeneity, and typically span a large extension, both in surface and in volume. Conditioning data derived from wells, on the other hand are almost always quite sparse and other data, like seismic data, have, in general, a relatively coarse resolution. It is therefore necessary to find methods to deal with non-exhaustive and coarse sampling, in order to make the most of available data. Several probabilistic, or geostatistical methods have been devised to this purpose and are applied to oil reservoir or aquifer simulations but also in other fields of earth science.

Generally speaking, non-exhaustive and coarse sampling is not a situation limited to earth sciences and occurs in many other fields as well; one may cite image processing, data processing, and finance, for example, but the list is clearly not exhaustive. Although several techniques are known to deal with these situations, there is clearly a constant need for new and advanced interpolation and extrapolation methods.

In the same field of endeavor, it is often necessary to increase the resolution of a sampled image, thus obtaining a fine image from a coarse one, the fine image having a larger number of pixels. Interpolation techniques can be used but, in this case, the interpolated image does not contain any more information at small scale than the coarse original image.

Multiple-point statistics is a known technique allowing the simulation of heterogeneous geological facies images. The simulated images (either in 2D or in 3D) respect the structures and morphology of a given reference training image and adhere to the conditioning data. This technique has been described, among others in the following documents, which are incorporated hereby by reference:

"Sequential Simulation Drawing Structures from Training Images" (2000) by Strebelle S. and Journel A. in Kleingeld and Krige (eds.), Geostatistics 2000 Cape Town, Vol. 1;

"Multivariate geostatistics: beyond Bivariate moments" (1993) by Guardiano F. and Srivastava M. in Soares A. (ed.) Geostatistics Troia '92 vol. 1 Kluwer Acad. Publ., Dordrecht.

"Conditional simulation of complex Geological structures using multiple-point statistics" (2002), Strebelle S, Methematical Geology, 34, No. 1, pp. 1-21.

"Multiple-Point Statistical Simulations Constrained by continuous Auxiliary Data" (2006), Chugunova, T. and Hu, L. paper presented at Int. Assoc. for Mathematical Geology Xlth International Congress, Université de Liege, Belgium.

"Multiple-Point geostatistics for modeling subsurface heterogeneity: a comprehensive review" (2008), Hu, L. and T. Chugunova, Water Resources Research, 26.

"Filter-Based Classification of Training Image Patterns for Spatial Simulation" (2006), Zhang, T., et al., Mathematical Geology, 38, 63-80.

"Incorporating Geological Conceptual Models and Interpretations into Reservoir Modeling using simple Multiple-Point Geostatistics" Zhang et al. Earth Science Frontiers, 15, 1, 01.01.2008, p. 26-35.

Following the algorithm proposed by Strebelle, the training image is scanned with a search template and all pixel configurations contained in the template are stored, most often, in a dynamically allocated tree structure. Further on, the statistics so gathered are used to compute the conditional probability at each simulated node and to fill a simulated model.

Document WO2006/023602 teaches a method for creating a reservoir facies model based on multiple-point statistics. FR2905181 also describes a similar method that further includes steps to take non-stationary models into account.

In conventional multiple-point simulations, the search template is not large enough to capture large scale structures such as channels. Multi-grid techniques have been devised to attempt to overcome this limitation.

In conventional multiple point simulation, the size of the search template, the number of facies and the degree of entropy of the training image determine the memory load. These parameters are quickly limited by the available memory, especially for large 3D grids. Particularly for 3D images, the need to keep the size of the tree within manageable limits imposes the use of a small search template, with the result that complex structures are much worse represented in 3D than in 2D.

The goal of a geostatistical simulation is to produce realizations of a spatially correlated variable Z at all locations m of a grid $u_i^{sim}$, i=[1, ..., m]. Given the neighborhood of a node, known multiple-point simulation techniques comprise a step of determining the probability distribution for the variable of interest Z at location $u^{sim}$, conditioned to the ensemble $N(u^{sim})$ of the values of the n neighboring nodes of $u^{sim}$:

$$\text{Prob}\{Z(u^{sim}) \leq z | N(u^{sim})\} \quad (1)$$

The conditional distribution is derived from a training image (TI) given as a prior model and representing the desired spatial structure of the field. The TI is scanned and all pixel configurations up to a certain size (the template size) are stored in a catalogue of data events, most often a tree structure. As previously noted, the size of the data events catalogue grows very rapidly with the size of the template, and the accuracy of the simulation is quickly limited, for practical cases, by the available memory. Because of this limitation, this approach is limited to categorical variables (facies). Increasing the number of facies or including information on secondary attributes further increases the memory demand.

BRIEF SUMMARY OF THE INVENTION

It is an aim of the present invention to propose a method to create a reservoir model that is free from the aforementioned limitations and, in particular, to propose a method that can be scaled to models of larger size.

Another aim of the invention is to propose a method to create a 3D reservoir model that allows a better representation of complex structures.

Another aim of the present invention is the provision of a modeling method that can deal effectively with continuous variables.

Another aim of the present invention is to propose a method of creating simulated images derived from a model image.

Further another object of the present invention is a method of completing a partial data set, like for example replacing missing or defective parts into a digital image, or extrapolating or interpolating data series.

A further object of the present invention is a method of increasing the resolution of a sampled data set or a sampled image.

According to the invention such objects are obtained by the method and the computer program that are the object of the independent claims.

BRIEF DESCRIPTION OF THE DRAWINGS

The invention will be better understood with the aid of the description of an embodiment given by way of example and illustrated by the figures, in which:

FIGS. 4a-4f show a simulation with a secondary variable used to reduce the uncertainty on a primary variable.

FIGS. 5a-5d show a simulation with a secondary variable used to describe non-stationarity of the training data.

DETAILED DESCRIPTION OF POSSIBLE EMBODIMENTS OF THE INVENTION

Definitions of the Mathematical Symbols $u^{sim}$ Vector describing the position of a node in the simulation.

$v^{ti}$ Vector describing the position of a node in the TI.

$\tau = \{h_1, \ldots, h_n\}$ Vectors (relative positions) describing a neighborhood.

$N_\tau(u) = \{z(u_1), \ldots, (u_n)\}$, $u_i = u + h_i$, Data event for a node u.

$d\{N_\tau(u), N_\tau(v)\}$ Distance between two data events using the same neighborhoods.

The simulation method of the present invention skips the step of creating a catalogue of data events that will be sampled, but rather samples directly the Training Image (also designated TI in the following) for a given data event. Events distributed according to function (1) are generated without extracting and storing all conditional distributions, as in the known methods. This is no limitation because, in the context of a stochastic simulation, the complete probability distribution of an event to occur is not relevant, but only one representative event issued from the probability distribution (1) is needed.

Figure 1A:
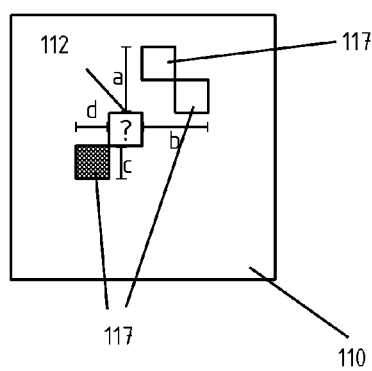
FIGS. 1a-1e shows a very simplified example of the direct sampling method of the invention.
Figure 1B:
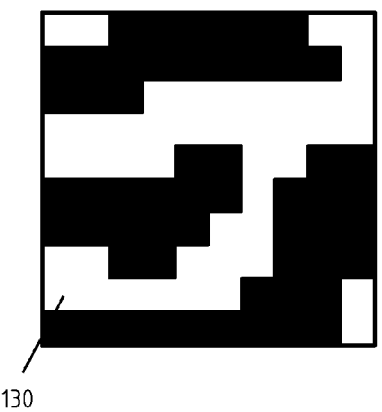

FIGS. 1a-1e shows a very simplified example of the direct sampling method of the invention. In this example, FIG. 1a illustrates a simulation grid 110 in which most of the nodes are unknown, and that must be filled with a dual-valued categorical variable, illustrated by black and white squares. Some of the nodes in FIG. 1a are known, because they have already been simulated in previous steps, or because they represent conditioning data, known in advance, for example. FIG. 1b represents the training image 130, which is filled with a dual-valued categorical variable. Returning to FIG. 1a, the simulation of a point of interest 112 comprises the step of defining a neighborhood $N_\tau(u^{sim})$ comprising three discontinuous neighboring points 117.

Figure 1C:
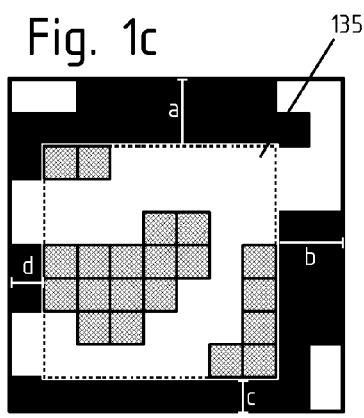

Preferably, the method of the invention includes a step of defining a search window 135, represented in FIG. 1c, in the training image. The search window is obtained by the offsets a, b, c, d in the neighborhood $N_\tau(u^{sim})$ The points in the search window 135 can be the centers of neighborhood $N_\tau(v^{ti})$ without going beyond image borders. Other strategies are possible, however.

Figure 1D:
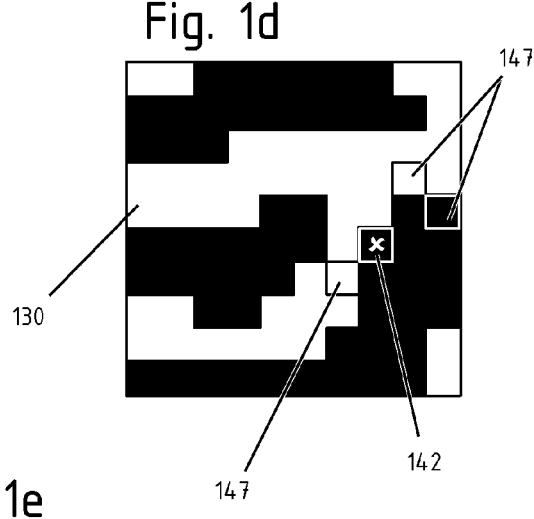

The method of the invention then searches the training image for a $N_\tau(v^{ti})$ satisfactorily matching $N_\tau(u^{sim})$. In a preferred variant this sampling is done by scanning randomly the training image 130 until a neighborhood $N_\tau(v^{ti})$ satisfactorily matching $N_\tau(u^{sim})$ is found. FIG. 1d shows an example of unsuccessful matching. The node 141 is chosen randomly in the scanning window. The values at nodes 147 of $N_\tau(v^{ti})$ do not correspond to the values of nodes 117 of $N_\tau(u^{sim})$.

Figure 1E:
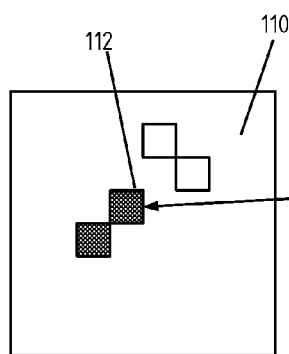
Figure 1E:
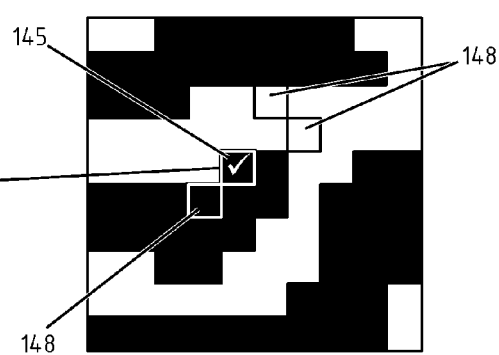

FIG. 1e shows an example of successful matching. The node 145 is chosen randomly in the scanning window of the training image. The neighborhood $N_\tau(v^{ti})$ consists of nodes 148 that have the same values as the nodes 117 of $N_\tau(u^{sim})$. The value of the central node 145 of $N_\tau(v^{ti})$ becomes the value of the point of interest 112 in the simulation grid 110. Preferably, the first $N_\tau(v^{ti})$ satisfactorily matching $N_\tau(u^{sim})$ is retained. The invention could however include further validation steps on $N_\tau(v^{ti})$.

It is worth noting that the algorithm of the invention does not impose a fixed shape to the neighborhood $\tau = \{h_1, \ldots, h_n\}$ and to the corresponding data event, i.e. it does not need a predefined data template. For each simulated node, the vectors defining the position of the nodes in the neighborhood can be different. In fact, even if we use the term central to define the point of interest 112, this point needs not necessarily be in the centre of the data event. The dimensions and size of the data event are only limited by the size of the TI and the simulation grid.

According to a variant of the invention, the neighborhood is defined dynamically for each simulated point u as the set $\tau = \{h_1, \ldots, h_n\}$ comprising the n relative vectors $h_n$ from u to the n closest previously simulated or conditioning nodes within a search radius I, where n and I are neighborhood parameter. It follows that the shape of the neighborhood changes at each simulated node. At each simulated node a window is defined in the TI. The shape of the window depends on the shape of the neighborhood. The scan occurs in this window only, in a linear fashion starting from a random initial point. Other search strategies are however possible and comprised in the scope of the present invention.

The dynamic event definition illustrated above has the advantage that multiple scales in the training image are automatically taken into account, as the algorithm will initially select large neighborhoods, when the determined points in the simulated image are relatively sparse, and later naturally reduce the neighborhood size, exploring finer structures in the training image. Importantly, and in contrast with usual Multi-grid techniques, the decrease in the size of the data event proceeds continuously and smoothly during the simulation, so all the structure scales in the TI are taken into account. Moreover this approach is self-adapting and needs not be "steered" by external parameters, as it is the case in known multi-grid algorithms in which the correct number of grids and template size must be set externally.

The changing shape of the data events has also the advantage of exploring the space of different pixel configurations. The method can traverse the simulation grid according to a random path, or according to any other path, for example a unilateral path.

As the algorithm searches the TI for a matching data event, it is not always necessary to exhaust the whole training image but, in typical cases, the search will succeed after having scanned only a small fraction of the available search space. In the best case, a match will be found at the first tried node of the TI. In the worst case, the number of tries will equal the number of nodes in the search space: that is the whole TI or a search window in the TI. Preferably the algorithm of the invention stops the scanning when a predefined fraction of the search space has been explored, in order to speed up execution.

When a data event is not found, the best available match is taken. This is fairly easier and faster than a recursive search in the catalogue of data event that is often necessary in conventional multi-point simulations.

More in detail, the direct sampling simulation algorithm of the present invention can be described by the following steps:

1) Assign all the conditioning data to their closest node in the simulation grid
2) Define a path through all the nodes that needs to be simulated in the simulation grid (random or unilateral).
3) For each node $u^{sim}$ of the simulation grid:
   a) Find the neighborhood of $u^{sim}$ made of n nodes, $\tau = \{h_1, \ldots, h_n\}$
   b) If no neighbor is found for $u^{sim}$:
      i) Randomly take a node $v^{ti}$ in the TI and assign its value $z(v^{ti})$ to $z(u^{sim})$.
      ii) Go to the next node (step 2)
   c) Define the data event $N_\tau(u^{sim}) = \{z(u^{sim}+h_1), \ldots, z(u^{sim}+h_n)\}$.
   d) Define the window in the TI where $\tau$ can fit.
   e) Randomly draw a location $v^{ti}$ in the window for an initial scanning point and iterate:
      i) Define $v^{ti}$ as the next node in the window. If the end of the window is reached, restart at the first node of the TI.
      ii) Find the data event $N_\tau(V^{ti})$.
      iii) Compute the distance $d\{N_\tau(u^{sim}), N_\tau(v^{ti})\}$
      iv) If $d\{N_\tau(u^{sim}), N_\tau(v^{ti})\}$ is the lowest distance so far for this simulated node $u^{sim}$, store $v^{ti}$, its value $z(v^{ti})$, and the distance in memory.
      v) If $d\{N_\tau(u^{sim}), N_\tau(v^{ti})\}$ is under the acceptance threshold t, the node is accepted: and its value $z(v^{ti})$ is attributed to $z(u^{sim})$, otherwise repeat from step b)); Otherwise, go to i.
      vi) If the number of iteration of steps b))-ii))iterations of the loop i-v has exceeded s, the node $v^{ti}$ with the lowest distance is accepted and its value is given to $z(u^{sim})$.

In the frame of the invention, the distance $d\{N_\tau(u^{sim}), N_\tau(V^{ti})\}$ between the data events can be defined in several ways, and can be adapted to the simulation of both continuous and categorical variables. According to a preferred embodiment, the distance used for categorical variables is the fraction of matching versus non-matching nodes in the data event, given by the indicator variable a that equals zero if two nodes have identical value and one otherwise:

$$d\{N_\tau(u), N_\tau(v)\} = \frac{1}{n}\sum_{n}^{i=1} a_i \in [0, 1], \qquad (2)$$

$$\begin{cases} z(u_i) = z(v_i) \Rightarrow a_i = 0 \\ z(u_i) \neq z(v_i) \Rightarrow a_i = 1 \end{cases}$$

This measure of the distance gives the same weight to tall nodes of the data event, regardless of their relative position to the central node. According to another variant, the metric (2) is replaced by $$d\{N_\tau(u), N_\tau(v)\} = \frac{\sum_{n}^{i=1} a_i g_i^{-\delta}}{\sum_{n}^{i=1} g_i^{-\delta}} \in [0, 1], \qquad (3)$$

$$\begin{cases} z(u_i) = z(v_i) \Rightarrow a_i = 0 \\ z(u_i) \neq z(v_i) \Rightarrow a_i = 1 \end{cases}$$

where the $a_i$ are defined as in (2), $g_i$ are the geometric distances to the central node and $\delta$ is an exponent.

For continuous variables, a preferred variant of the invention utilizes a mean per-node square difference normalized by $d_{max} = \text{argmax}(Z^{ti}) - \text{argmin}(Z^{ti})$, which is the largest fork between two values of Z. In alternative, the simulation method of the invention could use the mean absolute difference, or any other suitable norm function.

$$d\{N_\tau(u), N_\tau(v)\} = \frac{\sum_{n}^{i=1} [z(u_i) - z(v_i)]^2 g_i^{-\delta}}{d_{max}^2 \sum_{n}^{i=1} g_i^{-\delta}} \in [0, 1] \qquad (4)$$

In practice, it is preferable to retain a data event close to $N_\tau(u^{sim})$ within a certain distance, rather than searching a perfect match between $N_\tau(u^{sim})$ and $N_\tau(v^{ti})$. The acceptance threshold t under which a data event is considered as satisfactorily matched can be a predetermined constant or, preferably, a dynamic threshold varying as a function of the search progress.

Figure 2A:
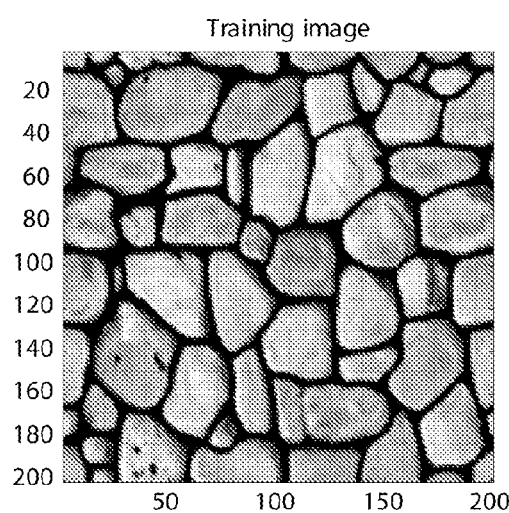
FIGS. 2a-2c illustrate the results obtainable with the method of the present invention.
Figure 2B:
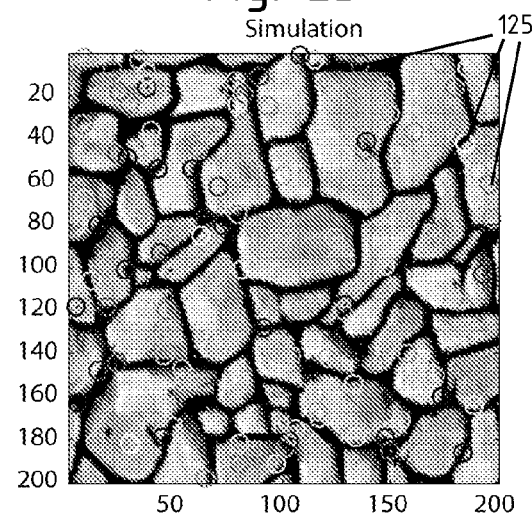
Figure 2C:
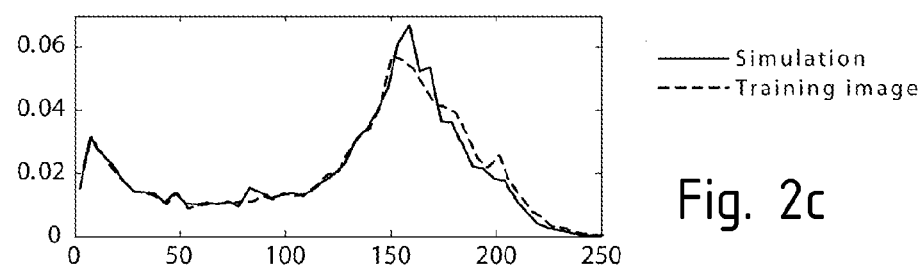

FIGS. 2a-2c illustrate the results obtainable with the method of the present invention. The image in 2a is a training image with a continuous variable, represented by different levels of gray in a 200×200 grid. The conditioning data are 100 initial random values marked by the circles 125 in the simulation grid of FIG. 2b. Taking random values ensures that the conditioning data are not consistent with the training image of FIG. 2a. Despite this, the algorithm of the invention produces the simulated image of FIG. 2b that is consistent with the TI and respects the conditioning data. The histograms of FIG. 2c, finally, represent the distribution of the variable's value in both the TI and the simulated data.

Since the method of the invention does not require the storage of probabilities, there is no limit to the size of the data event. We now present an embodiment of the present invention that takes advantage of this possibility to deal with large data events that are defined by different variables simulated jointly. In this case each simulated variable is defined in the training image. In the general case of m variables, the conditioned distribution function for the simulated variable v is $$\text{Prob}\{Z_v(u^{sim}) \le z | N_1(u_1^{sim}), \ldots, N_m(u_m^{sim})\} \quad (5)$$

Each variable v has his own neighborhood $N=\{z_v(u_1^{sim}), \ldots, (u_m^{sim})\}$. The distance between data events is defined, for example, as the weighted average of all distances specific for each variable v, with suitable weights w. The user is in general capable of choosing the weights w according to the relative importance of the variables in the TI. The distance thus becomes:

$$d_{joint}\{N_T^{joint}(u), N_T^{joint}(v)\} = \sum_{v=1}^{m} w_v d_v\{N_v(u), N_v(v)\} \in [0,1], \quad (6)$$

with $$\sum_{v=1}^{m} w_v = 1$$

FIGS. 3a-3e illustrate an example of joint simulation of two variables that are spatially correlated by some unknown function. In this case the variable 1 (FIG. 3a) is a binary categorical image, while the TI for the variable 2 (FIG. 3b) is obtained by smoothing variable 1 and adding an uncorrelated noise component. The result is that the TI for variables 1 and 2 are related by a non-linear, nonparametric transfer function.

Figure 3A:
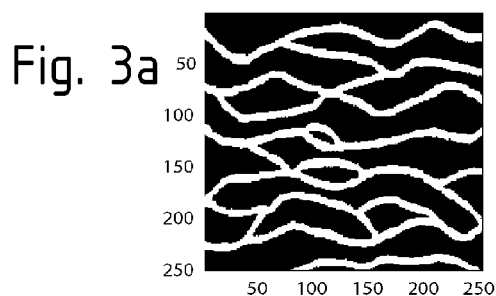
FIGS. 3a-3e illustrate an example of joint simulation of two variables that are spatially correlated by some unknown function with the simulation method of the invention.
Figure 3B:
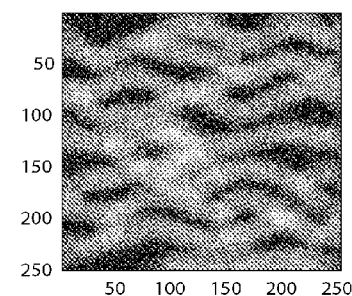
Figure 3C:
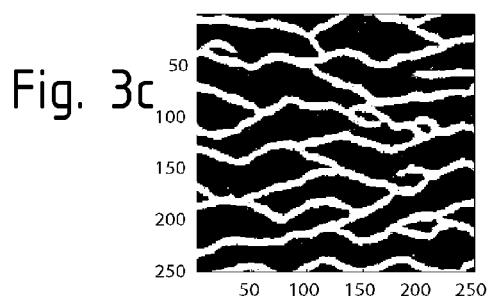
Figure 3D:
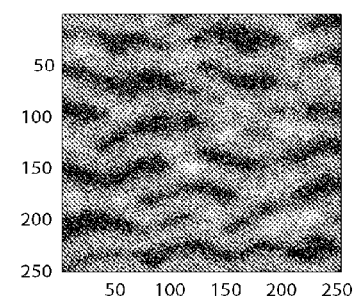
Figure 3E:
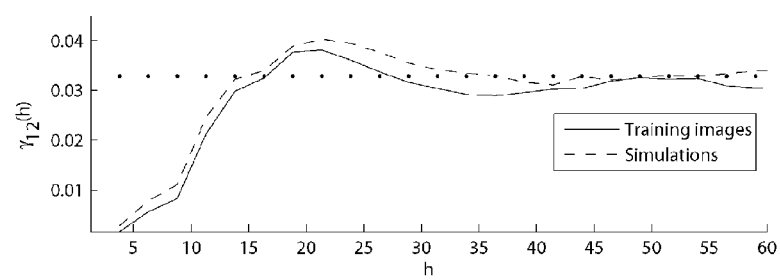

FIGS. 3c and 3d show the result of an unconditioned simulation on both variables 1 and 2 using a neighborhood composed of the thirty closest nodes for each variable. In this example the distance (3) was used for variable 1, and the distance (4) for the continuous variable 2. The correlation is well maintained in the simulation, both visually and in term of the cross-variogram (FIG. 3e).

According to another embodiment, the method of the invention is used to simulate joint variables distributions in which one of the variables is known. In this case the known variable becomes conditioning data guiding the simulation of other variables. This embodiment can be regarded as a simulation using a secondary variable.

The knowledge of the secondary variable can be used to reduce the uncertainty on the primary variable, as it is shown in FIGS. 4a-4f. The TI (FIGS. 4a and 4b) is the same as in the previous embodiment, and the reference field (FIG. 4c) is the result of an unconditional simulation. The secondary variable of the reference field (FIG. 4d) is fully known and is used as conditioning data for the simulation (FIG. 4e). FIG. 4f shows the mean of 100 simulations, reproducing the features of the reference map.

In another variant of the invention illustrated in FIGS. 5a-5d, a secondary variable is used to describe the non-stationarity of the TI. The TI for the variable 1 is a set of hand-drawn channels (FIG. 5a), in which the angle of the channel is a function of the x coordinate. The non-stationarity is thus described by a secondary variable that is simply a mapping of the X coordinate of the TI grid (FIG. 5b). The resulting simulation is conditional to variable 2, which is known, but is this time the coordinate Y of the simulation grid (FIG. 5d)

Figure 6A:
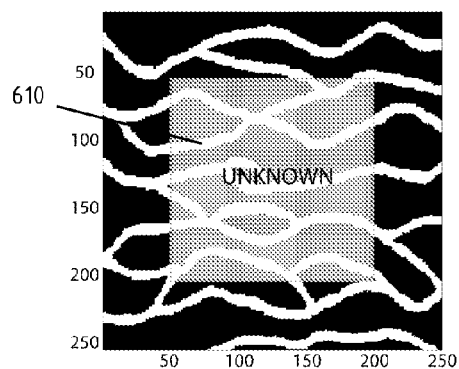
FIGS. 6a-6d exemplify a reconstruction of a partial image according to an aspect of the invention.
Figure 6B:
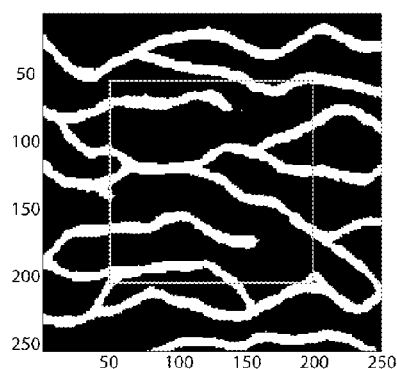
Figure 6C:
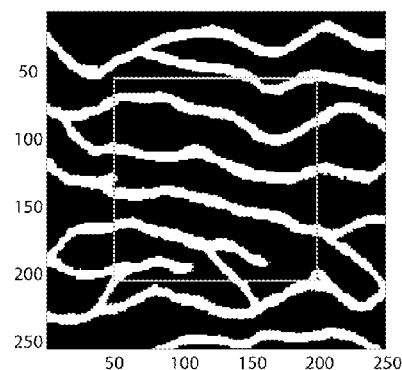
Figure 6D:
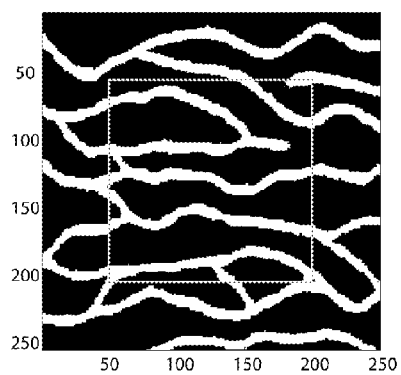

According to another example, the algorithm of the present invention can be used to reconstruct partial images. In this case the known elements of the image are used as TI for simulating the missing part, that is they are both conditioning data and training data for the simulation. FIGS. 6a-6d exemplify such reconstruction. FIG. 6a is an image comprising a two-valued categorical variable showing, for example, a network of sand channels in an impermeable clay matrix. The central square 610 is considered unknown and it is reconstructed by scanning the edges of the image. FIGS. 6b-6d illustrate three instances of simulated images obtained by the algorithm of the invention using the distance defined in (3). It can be appreciated that simulated regions integrate seamlessly at all scales with the known region. Although this example is relative to a categorical variable, it is possible to apply the invention to completion of images with a continuous variable as well.

The previous examples illustrated situation of incomplete sampling, but in which at least some continuous regions of the image are known. Thus, all the scales of detail are represented. The method of the invention is also applicable to cases in which the information available is scattered, and the small-scale details are poorly sampled or absent.

In another variant, the method of the invention can be applied to the task of increasing the resolution of an image, thus obtaining from a coarse grid a fine grid having a larger number of grid points, or pixels, and representing an image with a higher resolution.

Figure 7:
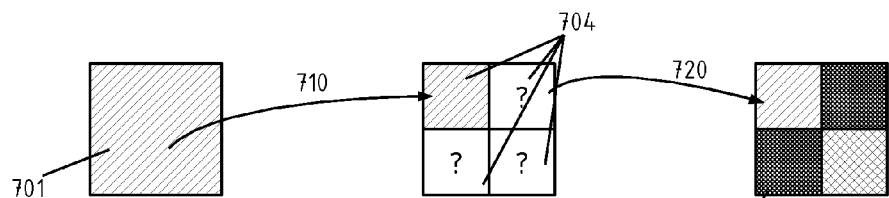
FIGS. 7 and 8 show a downscaling method according to another aspect of the invention.
Figure 7:
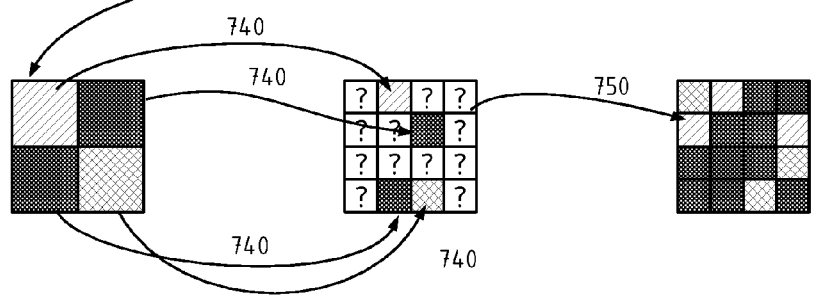
Figure 8:
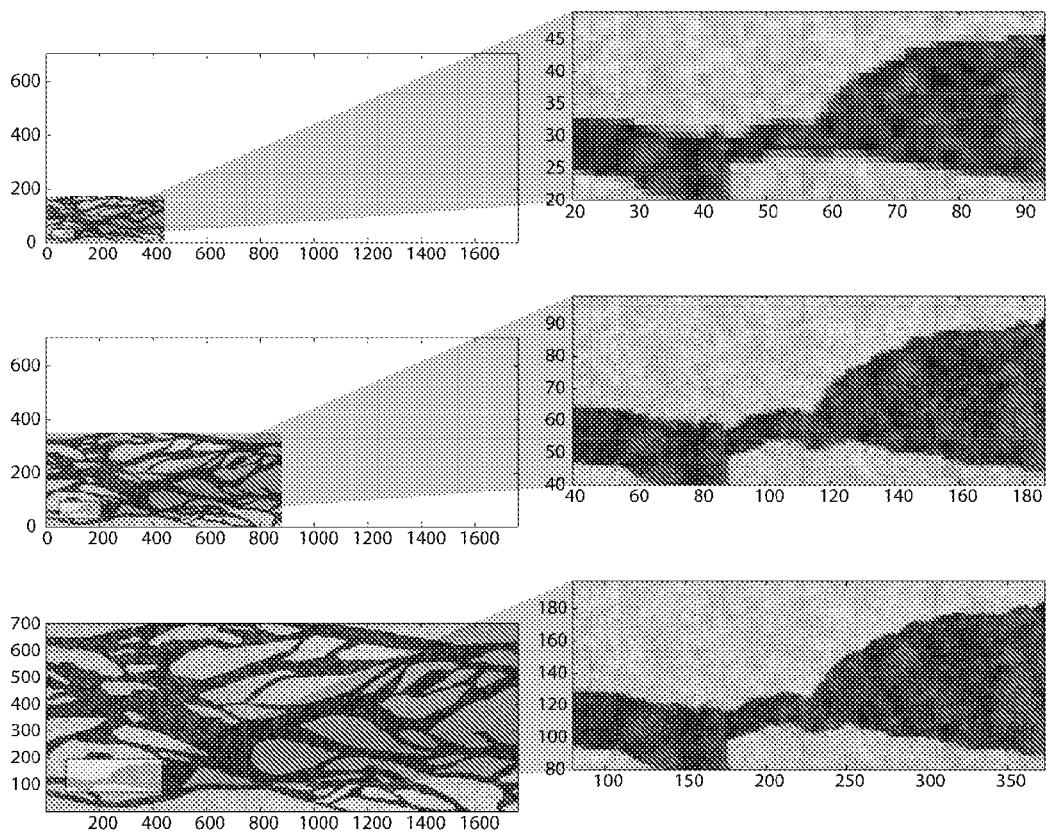

With reference to FIG. 7, this variant of the invention relates to a downscaling method comprising a step of dividing each node 701 of the coarse image into a number of children nodes 704, (typically four children nodes for a 2D case, corresponding to a factor two scaling in both directions, but other scaling ratios are possible), and attributing the value of the coarse node 701 into one children node (arrow 710), for example a randomly chosen children node. The remaining three children nodes are then simulated by the direct sampling algorithm presented above (arrow 720), choosing a suitable distance function, and using the coarse grid as training image. The process can be iterated as many times as required (arrows 730, 740, 750). FIG. 8 represents two steps of downscaling of an image including a continuous variable using the above-illustrated method.

Advantageously, the scaling method based on the direct sampling simulation algorithm of the invention provides a fine-scale image having small-scale structure that are inferred from the large-scale structures present in the coarse input image. The method of the invention generates realistic details at all scales, based on the assumption that the formation of interest has a fractal structure with scale invariance. A valuable feature of this scaling algorithm is the absence of adjustable downscaling parameters and of steps of prior estimation of the fractal dimension, required in other known methods.

Importantly, the algorithm of the present invention is suitable for an efficient parallel implementation in a multi-processor computer, or in a network of distributed computers or processing units. Parallelization is straightforward on shared memory machines: each processing unit performs the search in a limited portion of the TI only. On computer systems whose memory is not shared among processing units, the parallelization of the algorithm of the invention includes a master agent, which could be a processor, for example, or a specific software or hardware resource. The master agent is responsible for distributing sub-tasks to slave agents, each sub-task consisting, for example in scanning the training image with a given neighborhood and returning a simulated value. The master sends sequentially to each slave a pattern to find, and then waits for a resulting simulated value coming from any slave processor. Once this result is obtained, the master includes it in the simulation grid, finds the pattern associated to the next node and sends it to the same slave processor from which the result just came from. Then it waits again for a result coming from any slave processor.

Although the examples presented illustrate applications of the method of the invention to two-dimensional grids, it must be understood that the invention is not so limited and can be applied to the simulation of data having any dimensionality. In particular the method of the invention includes simulations in three-dimensional grids, for example in the field of geostatistics, and simulation, interpolation and extrapolation of one-dimensional data, for example data representing the sampled time evolution of one variable, or of several coupled variables. In particular the invention can be applied to the interpolation or extrapolation of scientific data or to the forecast of financial indexes.

Moreover, even if all the examples presented concern regular grids with equal-spaced nodes, it must be understood that the method of the present invention can also be extended to irregular grids of any kind.

The invention claimed is:

1. A method of modeling and optimizing the recovery from an oil or gas geological reservoir, according to a given set of training data, the method comprising the steps of:
   measuring conditioning values at certain points of the reservoir;
   including the conditioning values in a simulation grid;
   defining a simulation path in the simulation grid;
   iterating, for the nodes of the simulation path, the steps of:
      defining a neighborhood in the simulation grid, the neighborhood including a set of known neighbor nodes in the simulated grid having a spatial relationship with the node of the simulation path under treatment;
      randomly scanning the set of training data for a data set that matches said neighborhood;
      attributing to the node of the simulation path under treatment, the value of a node in the training data that has the same spatial relationship with the nodes of matching data set as the node of the simulation path under treatment with the defined neighborhood;
      stopping the scanning for a data set that matches said neighborhood at the first successful match;
      generating a simulated parameter field in the simulation grid; and
      optimizing the recovery of oil and gas from the geological reservoir.

2. The method of claim 1, further including a step of choosing the data set having the lowest distance to the neighborhood once a set number of iterations is exceeded.

3. The method of claim 2, wherein the simulation path is a random path.

4. The method of claim 1, wherein the step of scanning the set of training data includes the steps of computing a distance between the neighborhood and perspective matching data sets in the training data, and accepting a data set having a distance lower than a set threshold (which can be 0).

5. The method of claim 1, applied to the reconstruction of partial data, whereby the simulation grid includes known regions that are both conditioning data and training data for the simulation.

6. The method of claim 1, applied to the simulation of categorical variables, or continuous variable, or to multiple interrelated variables on the simulation grid.

7. The method of claim 1, wherein the simulation grid is one-dimensional, two-dimensional, or three-dimensional, or four-dimensional.

8. A method of modeling and optimizing the recovery from an oil or gas geological reservoir, according to a given set of training data, the method comprising the steps of:
   measuring conditioning values at certain points of the reservoir;
   including the conditioning values in a simulation grid;
   defining a simulation path in the simulation grid;
   iterating, for the nodes of the simulation path, the steps of:
      defining a neighborhood in the simulation grid, the neighborhood including a set of known neighbor nodes in the simulated grid having a spatial relationship with the node of the simulation path under treatment;
      searching the set of training data for a data set that matches said neighborhood without creating a catalogue of probabilities associated to the data events in the training data;
      attributing to the node of the simulation path under treatment, the value of a node in the training data that has the same spatial relationship with the nodes of matching data set as the node of the simulation path under treatment with the defined neighborhood;
      stopping the searching for a data set that matches said neighborhood at the first successful match;
      generating a simulated parameter field in the simulation grid; and
      optimizing the recovery of oil and gas from the geological reservoir.

9. A digital information processing system comprising a plurality of digital processors programmed to carry out the following steps:
   defining a simulation path in a simulation grid;
   iterating, for the nodes of the simulation path, the steps of:
      defining a neighborhood in the simulation grid, the neighborhood including a set of known neighbor nodes in the simulated grid having a spatial relationship with the node of the simulation path under treatment;
      randomly scanning the set of training data for a data set that matches said neighborhood;
      attributing to the node of the simulation path under treatment, the value of a node in the training data that has the same spatial relationship with the nodes of matching data set as the node of the simulation path under treatment with the defined neighborhood, and
      stopping the scanning for a data set that matches said neighborhood at the first successful match.

10. A method of down-scaling a coarse image obtaining a higher resolution image with a fine grid having a larger number of grid points or pixels, comprising:
- dividing each node of the coarse image into a number of children nodes;
- attributing the value of the coarse node to one children node;
- simulating the remaining children nodes by a direct sampling algorithm comprising:
  - defining a simulation path in the children nodes;
  - iterating, for the nodes of the simulation path, the steps of:
    - defining a neighborhood in the simulation grid, the neighborhood including a set of known neighbor nodes in the fine grid having a spatial relationship with the node of the simulation path under treatment;
    - randomly scanning the set of coarse nodes for a data set that matches said neighborhood;
    - attributing to the node of the simulation path under treatment, the value of a node in the coarse nodes that has the same spatial relationship with the nodes of matching data set as the node of the simulation path under treatment with the defined neighborhood.

11. The method of claim 10, wherein the step of scanning for a data set that matches said neighborhood stops at the first successful match.

* * * * *